United States Patent [19]
Pierce

[11] Patent Number: 4,960,200
[45] Date of Patent: Oct. 2, 1990

[54] CONVEYER BELT CLEANING AND SANITIZING APPARATUS

[75] Inventor: Christopher R. Pierce, Oakland, Calif.

[73] Assignee: Mepaco, Inc., Oakland, Calif.

[21] Appl. No.: 389,491

[22] Filed: Aug. 4, 1989

[51] Int. Cl.$^5$ .............................................. B65G 45/22
[52] U.S. Cl. ..................... 198/495; 198/496; 198/502.1
[58] Field of Search ............ 198/495, 496, 498, 502.1, 198/502.3, 810, 503

[56] References Cited

U.S. PATENT DOCUMENTS

| | | | |
|---|---|---|---|
| 1,026,755 | 5/1912 | Lundin | 198/503 |
| 1,111,752 | 9/1914 | Lichtenstein et al. | 198/496 |
| 2,083,864 | 6/1937 | Puckett | 198/496 |
| 2,266,309 | 12/1941 | Cohen | 198/495 |
| 3,578,151 | 5/1971 | Crawford | 198/496 |
| 3,695,170 | 10/1972 | Ehrenberg | 199/496 |
| 3,815,728 | 6/1974 | Vaughan | 198/495 |
| 3,819,032 | 6/1974 | Preuss et al. | 198/496 |
| 3,957,155 | 5/1976 | Enchelmaier | 198/496 |
| 4,860,883 | 8/1989 | Knaul et al. | 198/495 |

Primary Examiner—Joseph E. Valenza
Attorney, Agent, or Firm—Glen R. Grunewald

[57] ABSTRACT

Apparatus for cleaning and sanitizing a conveyor belt including a framework and a plurality of modules attachable to the framework to perform the tasks of debris removal, scrubbing, rinsing and sanitizing.

7 Claims, 4 Drawing Sheets

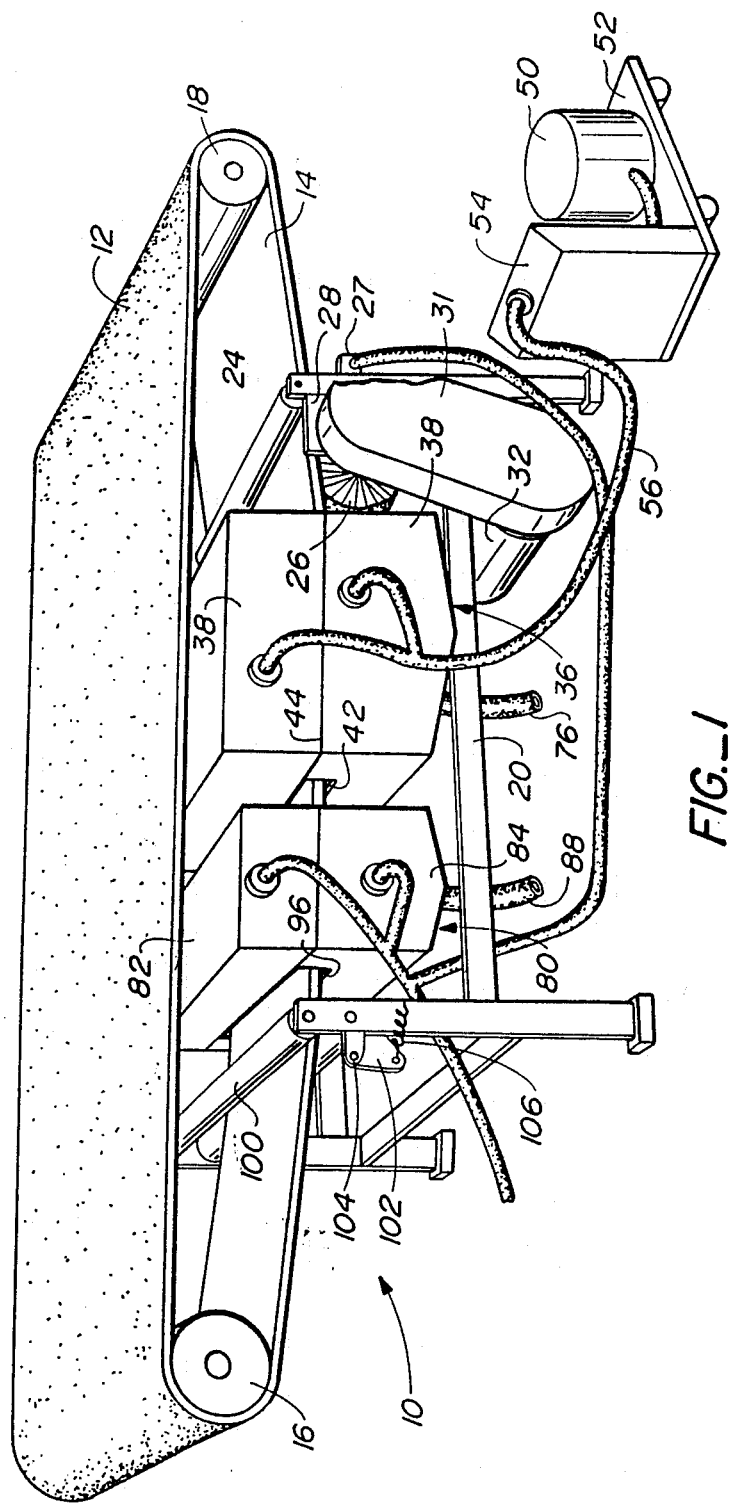
FIG._1

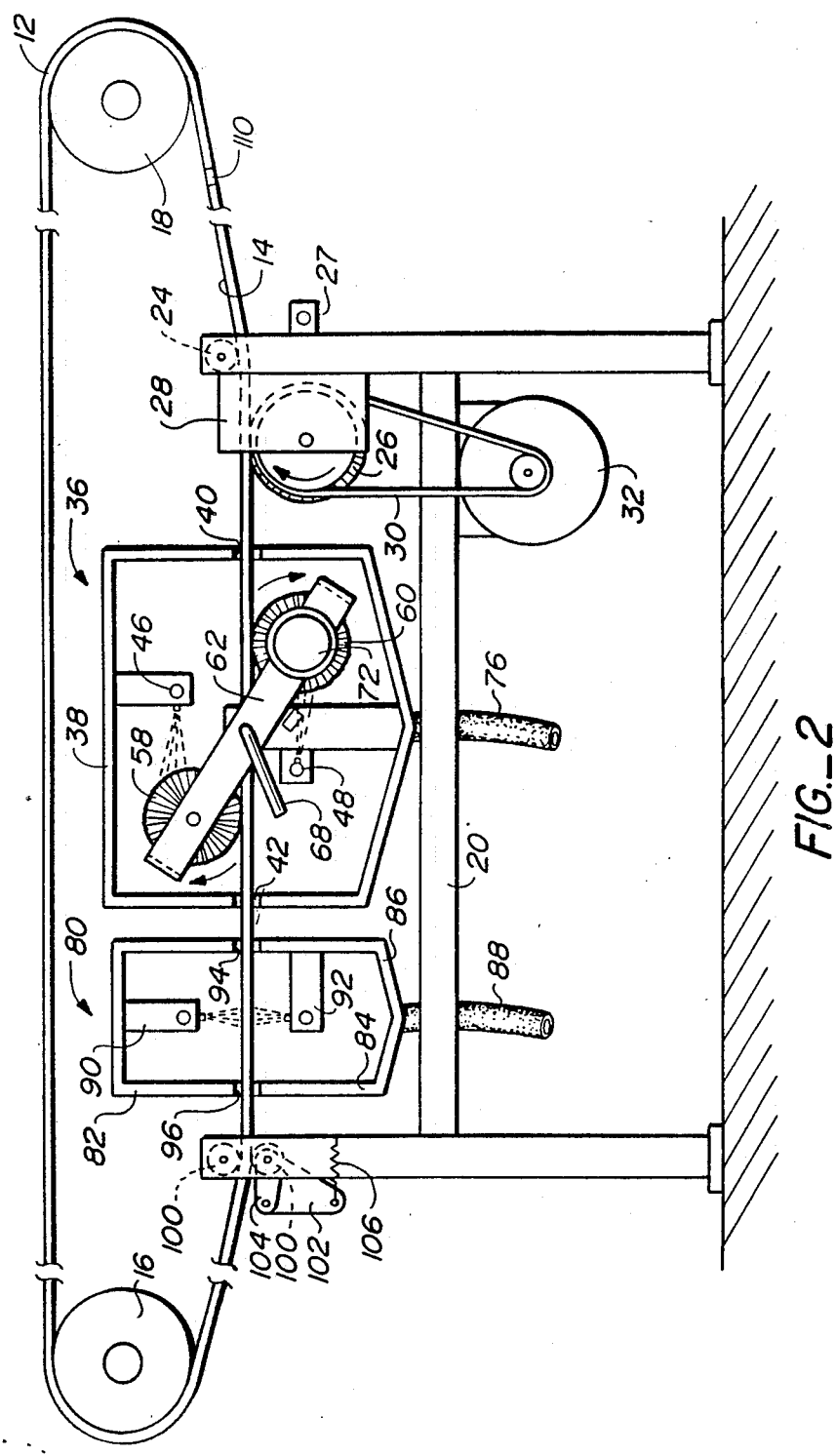
FIG._2

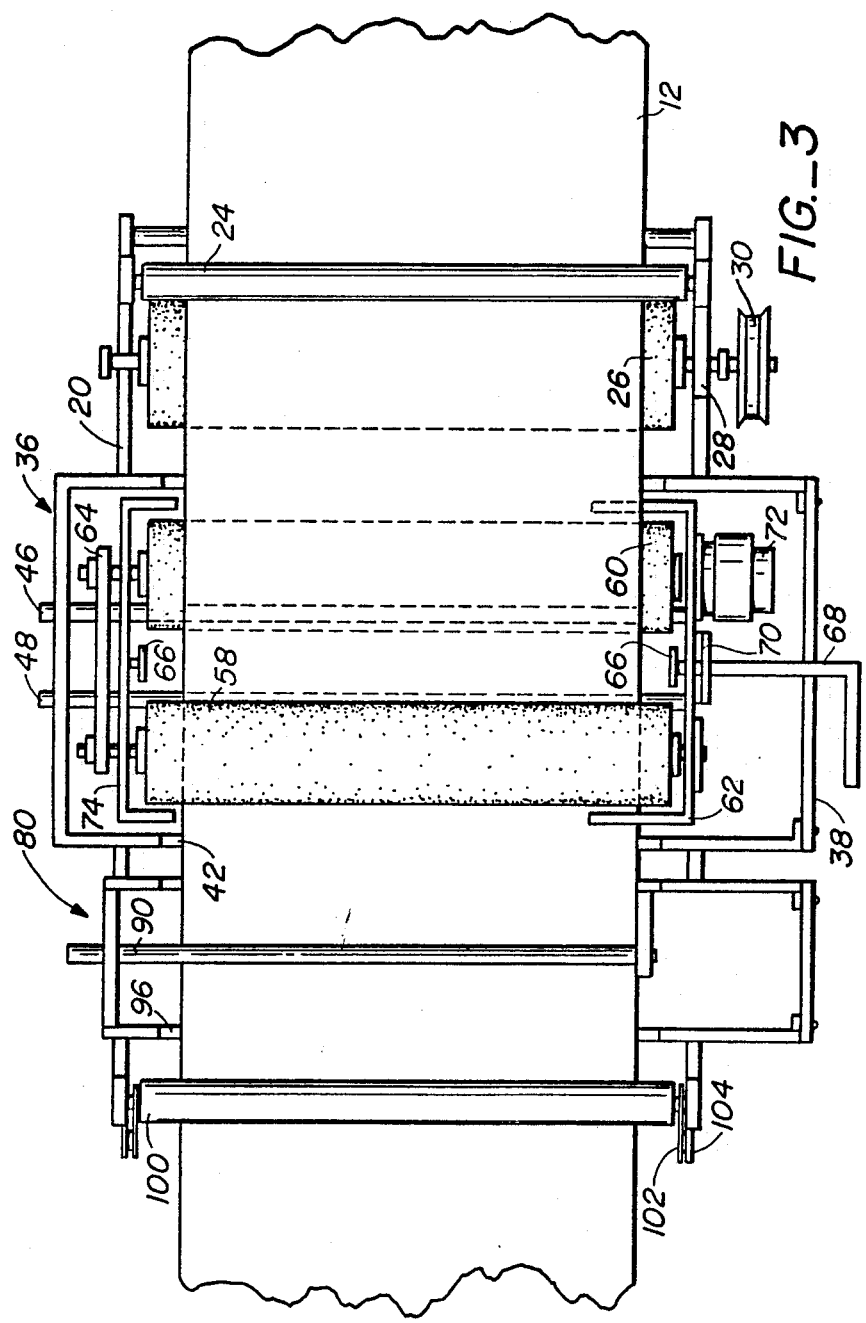
FIG._3

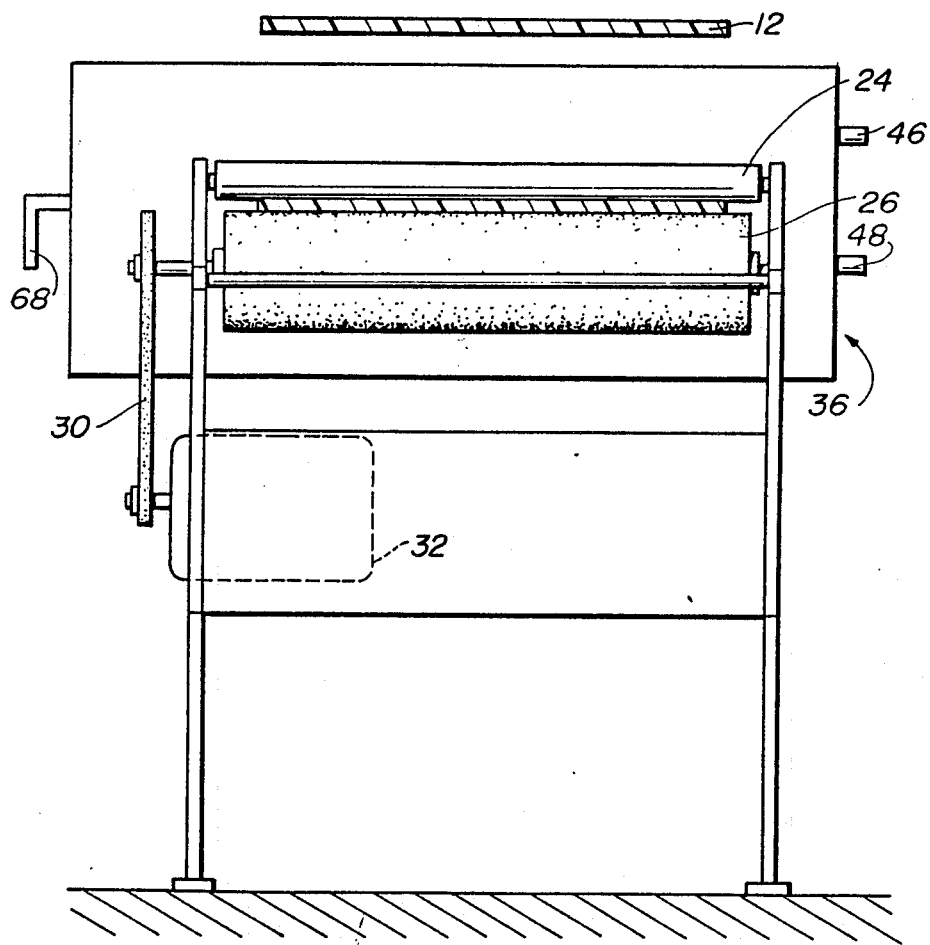
FIG._4

CONVEYER BELT CLEANING AND SANITIZING APPARATUS

TECHNICAL FIELD

The present invention relates to an apparatus for cleaning and sanitizing the conveying surface of a conveyer belt in environments wherein the belt is dirtied during its operation. For example, the apparatus of the present invention has particular application to the cleaning and sanitizing of conveyer belts employed to convey dressed poultry to packing or processing equipment.

BACKGROUND ART

In poultry processing operations, the conveyer belt transporting the poultry dirties the belt. Skin, flesh and fat fall onto the belt and may adhere thereto. Salmonella, listeria and other harmful agents may be deposited on the belt. For this reason, a conveyer belt utilized to transport poultry must, in accordance with various state and federal regulations, be cleaned and sanitized at regular intervals which may range, for example, from every four hours to one hour or less.

In the poultry processing industry, a conventional approach to sanitizing conveyer belts is to interrupt furnishing of poultry thereto, stop the belts, and manually scrub the conveying surfaces of the belts with a solution of soap or other chemicals that will remove particles (called "debris" in the trade) and kill bacteria. Obviously, such a process is both expensive and time consuming.

DISCLOSURE OF INVENTION

The present invention relates to apparatus incorporating structural elements which cooperate to clean and sanitize the conveying surface of a conveyer belt during movement thereof. The apparatus is disposed along the predetermined path of movement of the conveyer belt and performs its cleaning and sanitizing functions without requiring stoppage of the belt or manual scrubbing. Accordingly, the cleaning and sanitizing operations are performed in a highly efficient manner. The arrangement also lends itself to repeated passage of the moving conveying belt past the apparatus whereby a more thorough job of cleaning and sanitizing may be accomplished.

The apparatus includes a framework disposed along the predetermined path of movement of the conveyer belt. Attachable to the framework are individual modules, each of which performs a cleaning and sanitizing task. These tasks are performed in a sequential manner to obtain the desired objective.

In the preferred embodiment of the invention as disclosed herein, debris removal means is attachable to the framework for engaging the conveying surface and removing debris from the conveying surface. Downstream from the debris removal means is scrubber means also attachable to the framework. The scrubber means is adapted to scrub the conveying surface.

The scrubber means includes a housing defining an interior and openings disposed along the path of movement of the conveyer belt to permit passage of the belt through the interior. The scrubber means additionally includes applicator means for applying a cleaning agent to the conveying belt when the conveyer belt is in the interior and also brush means for brushing the conveyer belt substantially simultaneously with the application of the cleaning agent.

The brush means comprises brush mounting means, a plurality of rotary brushes rotatably mounted on the mounting means with at least one rotary brush disposed adjacent to the conveyer surface side of the conveyer belt and at least one rotary brush disposed adjacent to the side of the conveyer belt opposed to the conveyer surface side. Means are provided for rotating the rotary brushes and for selectively moving the mounting means relative to the conveyer belt to bring the rotary brushes into engagement with the conveyer surface side and the opposed conveyer side.

The applicator means comprises spray nozzle means in the housing and the apparatus additionally comprises a source of cleaning agent, conduit means providing a flow path between the cleaning agent source and the spray nozzle means, and pump means for pumping the cleaning agent through the conduit from the cleaning agent source to the spray nozzle means.

The following disclosure also describes rinser means attachable to the framework downstream from the scrubber means. The rinser means is adapted to rinse the conveying surface and, in addition, cooperates with the conveyer belt in such a manner as to apply a liquid sanitizing agent to the conveying surface for subsequent application to a belt support roller downstream from the rinser means.

The apparatus incorporates the above and other features which contribute to the ability of the apparatus to be readily utilized in a variety of environments. The modular nature of the operating components allows them to be added or removed as required. Furthermore, as described in greater detail below, the apparatus incorporates other features contributing to its flexibility of operation in a variety of operating conditions and environments.

Other features, advantages and objects of the present invention will become apparent with reference to the following detailed description and accompanying drawings.

BRIEF DESCRIPTION OF DRAWINGS

FIG. 1 is a diagrammatic perspective view illustrating a preferred form of apparatus constructed in accordance with the teachings of the present invention being utilized to clean and sanitize a conveyer belt;

FIG. 2 is a diagrammatic side view of the apparatus with parts thereof broken away to show operational details of selected components thereof;

FIG. 3 is a diagrammatic plan view of the apparatus; and

FIG. 4 is a diagrammatic end view of the apparatus.

BEST MODE FOR CARRYING OUT THE INVENTION

Referring now to the drawings, a preferred form of apparatus constructed in accordance with the teachings of the present invention is generally indicated by reference numeral 10. Apparatus 10 is for the purpose of cleaning and sanitizing the conveying surface 12 of a conveyer belt 14. The conveyer belt 14 is, as is conventional, in the form of a continuous loop and the conveyer belt moves along a predetermined path of movement about two rotatable rolls 16, 18, at least one of which is rotated by a suitable drive mechanism (not shown) to move the conveyer belt in a clockwise direction as viewed in FIGS. 1 and 2.

Apparatus 10 includes a framework 20 disposed along the predetermined path of movement of conveyer belt 14. In the illustrated embodiment, the framework 20 supports a plurality of components of modular construction which perform various tasks aimed at the cleaning and sanitizing of the conveyer surface 12. As can be seen with reference to the drawings, the cleaning and sanitizing takes place at the lower run of the conveyer belt.

After passing about roll 18, the conveyer belt is transported through a nip defined by support or guide roller 24 journaled on a pair of end posts comprising part of the framework 20. Immediately thereafter, the conveyer belt is engaged by debris removal means including a rotary brush 26 journaled at the ends thereof in side plates 28 of the framework. The brush may be of any suitable type, although it has been found that a brush with nylon bristles works well. The brush 26 should rotate so that the bristles thereof engaging the conveying surface 12 move in direction opposite to that of the conveying surface. In other words, referring to FIG. 1, the rotary brush 26 would be rotated in a clockwise direction as viewed in that figure. The brush will engage debris adhering to the conveyer belt and propel it downwardly away from the conveyer belt. The brush 26 is rotated by a drive belt 30 extending between a sheave at one end of the brush and a sheave attached to the output shaft of a motor 32. A housing 31 preferably covers the drive belt and sheaves.

A spray bar 27 connected to any suitable source (not shown) of sanitizing solution is adapted to spray such solution on brush 26 to sanitize the brush and prevent spread of contamination. Spray bar 27 preferably operates continuously during movement of the conveyor belt.

The next component receiving moving conveyer belt 14 is scrubber means 36. The scrubber means includes a housing 38 defining an interior and openings 40, 42 disposed along the path of movement of the conveyer belt and which permit passage of the belt through the interior of the housing. In the illustrated embodiment, housing 38 has an upper portion and a lower portion separated along juncture 44. Any suitable connector means (not shown) may be employed to secure the housing portions together and permit disassembly thereof when installing or removing the scrubber means relative to the conveyer belt.

Disposed in housing 38 are spray nozzles 46, 48 which comprise applicator means for applying a cleaning agent to the conveyer belt when the belt is in the housing interior. The cleaning agent, which may be, for example, a soap solution which may or may not contain chlorine, is furnished to the nozzles 46, 48 from a supply tank 50 mounted on a mobile support comprising wheeled platform 52 having wheels thereon. A pump 54, which is preferably an air driven pump, is also mounted on platform 52 and pumps the cleaning agent from supply tank 50 to the nozzles 46, 48 through a conduit 56. Conduit 56, along with other conduits employed in the apparatus, preferably employs quick connect-disconnect fittings at the ends thereof.

As may perhaps best be see with reference to FIGS. 2 and 3, in addition to the housing and applicator means, scrubber means 36 includes brush means for brushing the conveyer belt substantially simultaneously with the application of the cleaning agent.

The brush means includes two rotary brushes 58, 60 journaled at their ends in mounting means of a specified character. More particularly, the mounting means includes two spaced support arms 62, 74. At the center thereof, support arm 74 is pivotally disposed on pivot element 66 attached to the housing. Support element 62 is rigidly connected to the end of a rod 68 passing through apertures formed in a support plate 70 and one of the end walls of the housing 38, as may perhaps best be seen with reference to FIG. 3. The rod 68 is rotatably moveable relative to the support plate and the housing end wall and is bent 90 degrees outside the housing, as shown, to facilitate manual grasping by an operator and rotation of the rod and the support arms 62, 74.

Rotary brushes 58, 60 extend across the full width of the conveyer belt and are journaled at their ends at the extremities of support arms 62, 74. Since rod 68 is secured to support arm 62, rotation of the rod will rotate that support arm, the support arm 74 and the rotary brushes 58, 60 about a common pivot point.

At one end of rotary brush 60 is an air motor 72 of any suitable type. Air motor 72 is mounted on support ar 62 and provides the motive force to rotate the rotary brush 60 in the direction of the associated arrow illustrated in FIG. 2. A belt 64 extends between sheaves mounted at the other ends of rotary brushes 58, 60 to provide simultaneous rotation thereof. The air motor 72 is connected to a suitable source of compressed air (not shown) to actuate same to rotate the brushes 58 60.

It is important to note that the brushes 58, 60 are disposed on opposite sides of the conveyor belt 14. Brush 60 is disposed adjacent to the conveying surface 12 of the conveyer belt and rotary brush 58 is disposed adjacent to the side of the conveyer belt opposed to the conveying surface.

In operation, the nozzles 46, 48 spray cleaning agent directly on the rotary brushes as may perhaps best be seen with reference to FIG. 2. The brushes, in turn, deliver the cleaning agent to opposed sides of the conveyer belt. The brushes 58, 60 may be selectively brought into engagement with the conveyer belt and moved away therefrom. This may be readily accomplished simply by manually grasping the bent end of rod 68 outside of the housing 38 and rotating the rod. It will be appreciated that when the rod is moved counter-clockwise as viewed in FIG. 2, the brushes will be urged into engagement with the conveyer belt. On the other hand, when the rod is rotated clockwise, the brushes will be removed from the conveyer belt.

Obviously, the sprayed cleaning agent will tend to accumulate at the bottom of housing 38 during operation of the scrubber means. This may be drained away from the housing through a drain pipe 76 secured to the bottom of the housing and communicating with the interior thereof. The bottom of the housing may be slanted as shown to direct the fluid toward the drain pipe.

Downstream from the scrubber means 36 is rinser means 80 which, like the previously described debris removal means and scrubber means is selectively attachable to the framework 20 by suitable removable fasteners (not shown) such as screws or nuts and bolts. Rinser means 80 includes a housing having an upper portion 82 and a lower portion 84, the latter portion having a trough-like bottom 86 with a drain hole (not shown) in communication with a drain pipe 88.

The rinser means 80 additionally includes spray jets 90, 92 which, as shown in FIG. 2, direct a liquid sanitizing agent to the conveying surface 12 of the conveyer belt and the conveyer belt side opposed to conveying surface 12. One suitable liquid sanitizing agent is a solution of water and chorine. The belt enters the rinser means housing through a slit-like opening 94 and leaves the rinser means through a slit-like opening 96.

As was the case with scrubber means housing 38, the rinser means housing portions are selectively secured together by any suitable temporary fastener means along a line of juncture so that the rinser means may be assembled in place at the conveyer belt location or disassembled therefrom. Any suitable number of spray jets 90, 92 may be utilized, depending upon the spray area and width of the conveyer belt. The water-chlorine solution or other sanitizing agent is directed to spray jets 90, 92 from any suitable source (not shown).

After leaving opening 96, the conveyer belt 14 passes between a pair of support rollers 100 which define a press nip therebetween. The lower of the support rollers 100 is rotatably mounted at its ends on pivot plates 102, one of which is shown in FIG. 2. The pivot plates are rotatably attached to brackets comprising part of the framework. A spring 106 continually urges each pivot plate 102 in a counter-clockwise direction as viewed in that figure so that the lower support roller 100 is continuously pressed into engagement against the conveying surface 12 of conveyer belt 14.

When the conveyer belt 14 exits opening 96 the conveying surface thereof as well as the surface of the belt opposed to the conveying surface will have thereon a portion of the liquid-sanitizing agent sprayed onto the conveyer belt 14 by spray jets 90, 92. Since the support rollers 100 are immediately adjacent to the rinser means 80, the support rollers will engage the conveyer belt while it is still wet. Thus, the liquid-sanitizing agent will act to sanitize the support rollers 100.

In most cases, it is desirable to run the conveyer belt through several revolutions or cycles while operating the scrubber means. So that the operator will know when the desired number of cycles have been carried out, it is preferred that a tag or marker 110 be applied at an edge of the conveyer belt. If desired, the marker may be formed of metal and cooperate with suitable magnetic switching mechanism (not shown) to automatically terminate the operation of the scrubber means after a predetermined number of conveyer belt cycles. As indicated above, spray bar 27 preferably applies sanitizing solution at all times during movement of the conveyer belt. Rinser means 80 is also preferably operated on a continuous basis.

I claim:

1. Apparatus for cleaning and sanitizing the conveying surface of a conveyor belt moving along a predetermined path of movement, said apparatus comprising, in combination,
    a framework disposed along said predetermined path of movement;
    debris-removal means attachable to said framework for engaging said conveying surface and removing debris from said conveying surface;
    scrubber means attachable to said framework downstream from said debris removal means, said scrubber means including a housing defining an interior and openings disposed along said path of movement to permit passage of said conveyor belt through said interior, applicator means for applying a cleaning agent to said conveyor belt when said conveyor belt is in said interior, and brush means for brushing said conveyor belt substantially simultaneously with the application of said cleaning agent, said brush means comprising brush mounting means, a plurality of rotary brushes rotatably mounted on said mounting means with at least one rotary brush disposed adjacent the conveyor surface side of the conveyor belt and at least one rotary brush disposed adjacent to the side of the conveyor belt opposed to said conveyor surface side, drive means comprising an air motor operatively associated with each brush and means for delivering compressed air to said air motors, and means for selectively moving said mounting means relative to said conveyor belt to bring said rotary brushes into engagement with said conveyor surface side and the opposed conveyor side.

2. The apparatus according to claim 1 wherein said debris removal means, said scrubber means, and said rinser means are each of modular construction, and adapted for selective attachment to, or removal from, said framework.

3. The apparatus according to claim 1 wherein said applicator means comprises spray nozzle means in said housing, said apparatus additionally comprising a source of cleaning agent, conduit means providing a flow path between said cleaning agent source and said spray nozzle means, and pump means for pumping said cleaning agent through said conduit from said cleaning agent source to said spray nozzle means.

4. The apparatus according to claim 1 additionally including a support roller for supporting said conveyor belt downstream from said rinser means adjacent to said rinser means and in engagement with said conveying surface, said rinser means adapted to apply a liquid sanitizing agent to said conveying surface for subsequent application to said support roller to sanitize said support roller.

5. The apparatus according to claim 1 wherein said means for moving said mounting means includes a control element disposed outside said scrubber means housing to control movement of said brushes relative to said conveyor belt.

6. The apparatus according to claim 1 wherein said source of cleaning agent additionally comprises a mobile support, a supply tank containing cleaning agent mounted on said mobile support, and said pump means also being mounted on said mobile support adjacent to said supply tank.

7. Apparatus for cleaning and sanitizing the conveying surface of a continuous conveyor belt moving along a predetermined path of movement, said apparatus comprising in combination,
    a framework disposed along said predetermined path of movement;
    debris removal means attachable to said framework for engaging said conveying surface and removing debris from said conveying surface;
    scrubber means attachable to said framework downstream from said debris removal means, said scrubber means adapted to scrub said conveying surface for a selected number of complete revolutions of said continuous conveyor belt;
    indicator means attached to said conveyor belt at a location thereon whereby complete rotations of said belt may be monitored; and
    rinser means attachable to said framework downstream from said scrubber means, said rinser means adapted to rinse said conveying surface.

* * * * *